July 4, 1933.　　　P. G. EDWARDS　　　1,916,304
TESTING SYSTEM
Filed Feb. 21, 1930
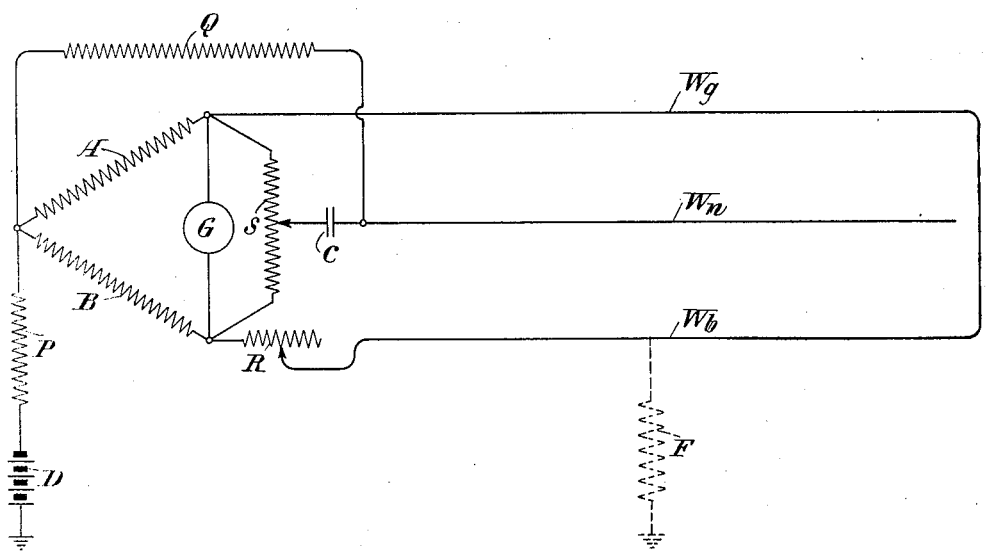
INVENTOR
P. G. Edwards
BY
ATTORNEY Patented July 4, 1933

1,916,304

UNITED STATES PATENT OFFICE

PAUL G. EDWARDS, OF BLOOMFIELD, NEW JERSEY, ASSIGNOR TO AMERICAN TELEPHONE AND TELEGRAPH COMPANY, A CORPORATION OF NEW YORK

TESTING SYSTEM

Application filed February 21, 1930. Serial No. 430,353.

This invention relates to testing systems. More particularly this invention relates to arrangements for locating a fault in a conductor.

When making Varley loop measurements for the location of a fault in a conductor, galvanometer fluctuations which may be produced by potentials induced from telegraph circuits, particularly those of the simplex and composite variety, and from other circuits, are often very troublesome, especially if the fault resistance is high. All of these extraneous effects greatly affect the speed as well as the accuracy required in the location of the fault.

One of the objects of this invention is to provide, in addition to the apparatus employed for making Varley loop measurements, means for neutralizing fluctuations in the galvanometer caused by foreign, induced, or other extraneous currents.

Another object of this invention resides in the provision of an arrangement such that extraneous potentials or induced currents tending to cause galvanometer fluctuation may be neutralized by similar potentials or currents induced in a neutralizing conductor or circuit connected or otherwise coupled to the galvanometer.

This invention will be better understood from the detailed description hereinafter following, when read in connection with the accompanying drawing showing one embodiment of the invention merely for the purpose of illustration.

The drawing shows an arrangement for substantially neutralizing the effects of extraneous voltages often known as "ground potentials". The reference characters A and B represent equal elements of resistance one end of each of which is connected to the other and to ground through a resistance P and a source of direct current which may be a battery designated D. The other ends of the resistances A and B are interconnected by a galvanometer G which may be of any well known type. A faulty wire is designated $W_b$, and one end of this wire is connected to the junction of the galvanometer G and the resistance B through a rheostat R. A good conductor designated $W_g$ is connected to the junction of the galvanometer G and the resistance A. The other ends of the conductors $W_g$ and $W_b$ are connected to each other. The elements just described represent those which are frequently used for making Varley loop measurements to determine the location of a fault which may be present in the conductor $W_b$, some point of which is grounded through resistance shown by dotted lines and designated F.

When the fault is at the extreme end of the conductor $W_b$, then both conductors $W_b$ and $W_g$ will be equally affected by induced voltages or other extraneous effects, and the pointer of the galvanometer G will not be fluctuated on account of these effects. When the fault does not occur at the extreme end of a conductor, a fault seldom occurring at that point, then the effective voltages resulting from extraneous potentials will differently affect conductors $W_g$ and $W_b$ and consequently the pointer of the galvanometer will be fluctuated. In that event, it will be difficult, if not impossible, to make an accurate determination of the distance to the fault.

In accordance with this invention, all of the resistance of a potentiometer S is bridged across the galvanometer G. A neutralizing conductor $W_n$ is connected in series with a condenser C to the moving contact or element of the potentiometer S. The junction of the conductor $W_n$ and the condenser C is connected to the junction of the resistances A and B through a resistance Q. With this arrangement the resistance Q represents a low impedance for direct current as compared with the insulation resistance of the condenser C. Yet, resistance Q interposes a high impedance for alternating currents. The condenser C is of large capacity and presents low impedance for alternating currents, yet its impedance is practically infinite for direct current. With this arrangement, any leakage current from battery D to conductor $W_n$ flows through the resistance Q rather than through the relatively high resistances presented by the arms A and B of the bridge and the upper and lower portions of potentiometer S, respectively, and condenser C, and therefore such current will not affect the galvanometer G. Only so much of the current from battery D as flows over the good and bad conductors $W_g$ and $W_b$, respectively, will be effective in causing the moving element of the galvanometer to become deflected.

In a general way it will be evident that potentials induced in the conductor $W_g$ will be greater than those induced in the conductor $W_b$ because the latter conductor will be grounded through a resistance F at a point somewhat distant from its extreme end. Those potentials induced in conductors $W_g$ and $W_b$ will therefore differently affect galvanometer G, and the difference between these potentials will be the one it will be necessary to neutralize. The neutralizing conductor $W_n$ should be selected so that potentials induced therein will be approximately the same in magnitude and phase as those induced in the conductor $W_g$ when $W_g$ is free. The required amount of neutralization may be obtained by properly setting the potentiometer S. When the proper setting is obtained, the potentials impressed on the two sides of the galvanometer will be equal and opposite to those caused by conductors $W_b$ and $W_g$, and the net voltage from the inducing sources will be zero. It will be apparent that the neutralizing conductor $W_n$ should preferably be in the same quad as both conductors $W_g$ and $W_b$, and moreover, it should have an insulation resistance to ground of the same order to magnitude as that of the good conductor $W_g$. The condenser C has a sufficiently low impedance so as not to appreciably affect the phase angle or magnitude of the neutralizing current.

It is to be noted that a pair of conductors may be substituted for the one designated $W_n$, and one end of one of these may be connected to an end of the other and to condenser C. The two conductors will then be open-circuited at their other ends, as is the conductor $W_n$ shown in the drawing. The pair of conductors should have an insulation resistance to ground comparable with that of the conductor $W_g$.

In determining the location of a fault in conductor $W_b$, the bridge will be balanced as closely as possible in the usual manner by the adjustment of the resistance R. Then the potentiometer S will be adjusted until the galvanometer indicates a minimum of fluctuation. Under ordinary circumstances the pointer of the galvanometer will be practically stationary. The position of the movable arm of the potentiometer will depend upon the location of the fault and the relative insulation resistances of the conductors involved. It has been found that when the fault is at the distant end of the conductor $W_b$, it will be necessary to set the potentiometer at its midpoint. When the fault is very close to the rheostat R it will be necessary to move the variable element of the potentiometer to its lower terminal. In general, the potentiometer will require setting at an intermediate position for any other location of the fault. The actual location is made in the usual manner.

In an arrangement actually constructed in accordance with the layout of the drawing, the resistance G was 100,000 ohms, the total resistance of the potentiometer was 4000 ohms, and the condenser C had a capacity of 20 microfarads. Fluctuation of the galvanometer was neutralized to a very high degree.

While this invention has been shown in one particular arrangement merely for the purpose of illustration, it will be understood that the features of this invention may be applied to other and widely varied organizations without departing from the spirit of the invention and the scope of the appended claims.

What is claimed is:

1. The combination of apparatus including a galvanometer for making Varley loop measurements, and means capacitively coupled to the galvanometer supplying currents for neutralizing the effects of extraneous potentials which fluctuate the pointer of the galvanometer.

2. The combination of a Wheatstone bridge circuit adapted to make Varley loop measurements and including a galvanometer, a potentiometer in shunt across one diagonal of said Wheatstone bridge circuit, and means for transmitting currents to the potentiometer for neutralizing the effect on the Wheatstone bridge circuit of extraneous interfering potentials.

3. The combination of a Wheatstone bridge circuit, a potentiometer in shunt with one diagonal of the bridge circuit, and means for transmitting currents to the potentiometer for neutralizing the effect on the Wheatstone bridge circuit of extraneous interfering potentials.

4. The combination of a Wheatstone bridge circuit, one of the arms of which includes a conductor to be tested, and means coupled to one diagonal of said circuit to neutralize the effects of potentials superimposed on said conductor.

5. The combination of a Wheatstone bridge circuit, a potentiometer connected as a diagonal of said circuit, an open-ended conductor connected to the adjustable arm of said potentiometer, and means to bypass leakage currents over said conductor from said circuit.

6. The combination of a Wheatstone bridge circuit, an open-ended conductor connected to said circuit, and means to substantially suppress the effects of leakage current over said conductor from said circuit.

7. The combination of a conductor, testing apparatus for locating a fault on the conductor, means for neutralizing the effects upon said apparatus of currents induced in said conductor, and means for substantially eliminating the effect upon said apparatus of leakage current through said conductor.

8. The method of locating a fault in a conductor with Wheatstone bridge apparatus, which consists in making the ordinary Varley loop measurements and supplying currents to the Wheatstone bridge apparatus from a parallel conductor which is open-ended for neutralizing the effect of ground potentials on these measurements.

9. The method of locating a fault in a conductor with Varley loop apparatus which includes a galvanometer, which consists in receiving over a parallel opened-ended conductor extraneous potentials which interfere with the measurements and impressing these potentials on the galvanometer for neutralizing the effects of these potentials.

10. The combination of testing apparatus including a galvanometer to locate a fault on a conductor, and means including a parallel open-ended conductor which supplies current to neutralize the effects of extraneous induced potentials impressed upon the galvanometer of said apparatus.

11. The combination of a potentiometer, indicating means electrically coupled to said potentiometer, and an open-ended, current carrying conductor capacitively connected to the movable arm of the potentiometer, said conductor being exposed to extraneous potentials and supplying currents for neutralizing the effects on the indicating means of these extraneous potentials.

12. The combination of apparatus for making Varley loop measurements and including a galvanometer, a potentiometer bridging the galvanometer, and a wire capacitively connected to the movable arm of the potentiometer, said wire being exposed to extraneous potentials and supplying the currents required for neutralizing the effects of these extraneous potentials which may fluctuate the pointer of the galvanometer.

13. The combination of a measuring instrument forming a part of a testing system, a resistance shunting said instrument, an open-ended wire exposed to extraneous voltages and carrying currents produced by these voltages, and a condenser interconnecting that wire with some point on said resistance, the current carried by said wire neutralizing the effects of these extraneous potentials which may disturb the measuring instrument.

14. The combination of apparatus including a galvanometer for testing purposes, a loop embodying conductors to be tested and connected in series with the galvanometer, a potentiometer shunting said galvanometer, and a wire one end of which is capacitively connected to the movable arm of said potentiometer, said wire being exposed to extraneous potentials and supplying currents for neutralizing the effects of these extraneous potentials which may fluctuate the pointer of the galvanometer.

15. The combination of testing apparatus including a galvanometer, a good wire, a bad wire in series with the good wire and the galvanometer, a potentiometer shunting the galvanometer, a neutralizing wire, and a condenser connecting one end of said neutralizing wire to the movable arm of the potentiometer, the other end of the neutralizing wire remaining open, said neutralizing wire being exposed to extraneous potentials and supplying currents to overcome the effects of these extraneous potentials which may fluctuate the pointer of the galvanometer.

16. The combination of two equal resistances having a common junction, a galvanometer connected between the other ends of said resistances, said resistances and said galvanometer forming part of a testing system, a first conductor one end of which is connected to one terminal of the galvanometer, a second conductor one end of which is connected to the other terminal of the galvanometer, the other ends of said first and second conductors having a common junction, a potentiometer shunting the galvanometer, a third conductor, and a condenser interconnecting one end of the third conductor with the movable arm of the potentiometer, the third conductor being exposed to extraneous potentials and supplying currents for neutralizing the effects of these extraneous potentials which may fluctuate the pointer of the galvanometer.

17. The combination of two equal resistances which have a common junction, a galvanometer interconnecting the other ends of said resistances, said resistances and said galvanometer forming part of a testing system, a first conductor one end of which is connected to one terminal of the galvanometer, a second conductor one end of which is connected to the other terminal of the galvanometer, the distant ends of said first and second conductors having a common junction, a potentiometer shunting the galvanometer, a third conductor, a condenser interconnecting one end of the third conductor with the movable arm of the potentiometer, and a third resistance interconnecting the same end of the third conductor with the junction of said first and second resistances, the third conductor being exposed to extraneous potentials and supplying currents for neutralizing the effects of these extraneous potentials which may fluctuate the pointer of the galvanometer.

18. The combination of two equal resistances which have a common junction, a galvanometer interconnecting the other ends of said resistances, a first conductor one end of which is connected to one terminal of the galvanometer, a second conductor one end of which is connected to the other terminal of the galvanometer, the distant ends of said first and second conductors having a common junction, a potentiometer shunting the galvanometer, a third conductor, a condenser interconnecting one end of the third conductor with the movable arm of the potentiometer, a third resistance interconnecting the same end of the third conductor with the junction of said first and second resistances, and a grounded battery connected to the junction of said equal resistances, the third conductor being exposed to extraneous potentials and supplying currents for neutralizing the effects of these extraneous potentials which may fluctuate the pointer of the galvanometer.

19. The combination of two equal resistances which have a common junction, a galvanometer connected to the other terminals of said resistances, a good conductor one end of which is connected to one terminal of the galvanometer, a bad conductor, a rheostat interconnecting one end of the bad conductor with the other terminal of the galvanometer, the distant ends of the good and bad conductors having a common junction, a potentiometer shunting the galvanometer, a neutralizing conductor, a condenser interconnecting one end of the neutralizing conductor with the movable arm of the potentiometer, a third resistance interconnecting the same end of the neutralizing conductor with the junction of the two equal resistances, and a grounded battery connected to the junction of said two equal resistances, the neutralizing conductor being exposed to extraneous potentials and supplying currents for neutralizing the effects of these extraneous potentials which may fluctuate the pointer of the galvanometer.

20. The combination of a Wheatstone bridge circuit, a potentiometer connected as a diagonal of said circuit, and an open-ended conductor connected to the movable arm of said potentiometer, said conductor being exposed to extraneous potentials and supplying currents for neutralizing the effects of these extraneous potentials which may reach the Wheatstone bridge circuit.

21. The method of locating a fault with apparatus including a galvanometer for making Varley loop measurements, which includes exposing an open-ended conductor to undesired effects and simultaneously sending through the galvanometer currents derived from the open-ended conductor to overcome these undesired effects on the galvanometer.

In testimony whereof, I have signed my name to this specification this 20th day of February, 1930.

PAUL G. EDWARDS.